United States Patent
Morrow

(10) Patent No.: US 9,855,696 B2
(45) Date of Patent: Jan. 2, 2018

(54) AERIAL INTEGRATED MESSENGER CONDUIT

(71) Applicant: CommScope, Inc. of North Carolina, Hickory, NC (US)

(72) Inventor: Jason N. Morrow, Taylorsville, NC (US)

(73) Assignee: CommScope, Inc. of North Carolina, Hickory, NC (US)

( * ) Notice: Subject to any disclaimer, the term of this patent is extended or adjusted under 35 U.S.C. 154(b) by 450 days.

(21) Appl. No.: 14/468,540

(22) Filed: Aug. 26, 2014

(65) Prior Publication Data

US 2015/0144218 A1   May 28, 2015

Related U.S. Application Data

(60) Provisional application No. 61/908,678, filed on Nov. 25, 2013.

(51) Int. Cl.
| | |
|---|---|
| *F16L 3/00* | (2006.01) |
| *B29C 47/00* | (2006.01) |
| *B29C 47/02* | (2006.01) |
| *H02G 7/05* | (2006.01) |
| *B29K 23/00* | (2006.01) |
| *B29K 705/00* | (2006.01) |
| *B29L 23/00* | (2006.01) |
| *B29L 31/34* | (2006.01) |
| *B29C 47/28* | (2006.01) |
| *B29K 27/00* | (2006.01) |
| *H02G 3/04* | (2006.01) |
| *H02G 7/10* | (2006.01) |

(52) U.S. Cl.
CPC ........ *B29C 47/0023* (2013.01); *B29C 47/027* (2013.01); *H02G 7/05* (2013.01); *B29C 47/28* (2013.01); *B29K 2023/06* (2013.01); *B29K 2023/065* (2013.01); *B29K 2023/0608* (2013.01); *B29K 2027/16* (2013.01); *B29K 2705/00* (2013.01); *B29K 2995/0016* (2013.01); *B29L 2023/22* (2013.01); *B29L 2031/3462* (2013.01); *H02G 3/0481* (2013.01); *H02G 7/10* (2013.01)

(58) Field of Classification Search
USPC .................................................. 138/106, 107
See application file for complete search history.

(56) References Cited

U.S. PATENT DOCUMENTS

| | | | | |
|---|---|---|---|---|
| 1,905,761 | A | * | 4/1933 | St. John .................. H02G 7/06 174/41 |
| 3,464,660 | A | | 9/1969 | Neale, Sr. |
| 3,483,313 | A | | 12/1969 | Schaffhauser |
| 3,846,575 | A | * | 11/1974 | Troy .................... H02G 3/0481 138/128 |

(Continued)

*Primary Examiner* — James Hook
(74) *Attorney, Agent, or Firm* — Muncy, Geissler, Olds & Lowe, P.C.

(57) ABSTRACT

An overhead conduit includes a duct extending in a longitudinal direction. The duct has an outer wall. A strength member, such as a messenger wire, abuts the outer wall of the duct. An extruded jacket surrounds the duct and the messenger wire. The extruded jacket follows the outer contours of the duct and the messenger wire. Optional first and second sub-ducts, smaller than the duct, may be located to the right and left of the messenger wire.

20 Claims, 8 Drawing Sheets

(56) References Cited

U.S. PATENT DOCUMENTS

| | | | | |
|---|---|---|---|---|
| 4,023,756 | A | * | 5/1977 | Baker .................. F16L 3/217 |
| | | | | 138/107 |
| 4,565,351 | A | * | 1/1986 | Conti .................. H02G 1/081 |
| | | | | 138/108 |
| 4,662,712 | A | * | 5/1987 | Tabata ................ G02B 6/4422 |
| | | | | 174/41 |
| 4,856,867 | A | | 8/1989 | Gaylin |
| 5,678,609 | A | | 10/1997 | Washburn |
| 5,743,300 | A | | 4/1998 | McNeill |
| 6,249,628 | B1 | * | 6/2001 | Rutterman .......... G02B 6/4495 |
| | | | | 385/100 |
| 6,283,158 | B1 | | 9/2001 | Botsolas et al. |
| 6,546,175 | B1 | | 4/2003 | Wagman et al. |
| 6,691,742 | B1 | | 2/2004 | Cooper |
| 6,739,926 | B2 | * | 5/2004 | Riach .................. F16F 9/006 |
| | | | | 138/106 |
| 6,886,601 | B2 | | 5/2005 | Allen |
| 2005/0067038 | A1 | * | 3/2005 | Kobayashi ........... F16L 59/022 |
| | | | | 138/149 |
| 2005/0224124 | A1 | | 10/2005 | Grimsley et al. |

* cited by examiner

AERIAL INTEGRATED MESSENGER CONDUIT

This application claims the benefit of U.S. Provisional Application No. 61/908,678, filed Nov. 25, 2013, which is herein incorporated by reference.

BACKGROUND OF THE INVENTION

1. Field of the Invention

The present invention relates to conduit and more particularly to overhead or suspended conduit, which includes at least one duct attached to a strength member, e.g. a messenger wire or cable.

2. Description of the Related Art

Overhead or suspended conduit is known in the prior art. For example, FIG. 1 is a perspective view of a typical overhead conduit 11, and FIG. 2 is a cross sectional view taken along line II-II in FIG. 1.

Typical overhead conduit 11 includes a steel messenger wire 13 embedded in a polymer coating 15. A polymer web 17 has an upper end integrally formed with the coating 15 surrounding the messenger wire 13. The opposite end of the web 17 is integrally formed with a polymer forming a duct 19. The duct 19 forms a path for cables such as coaxial cables, twisted pair cables, power/control cables and/or fiber optic cables. In particular, duct 19 protects the cables from moisture and other hazards in the environment, e.g. UV sun ray, contact with sharp objects, damage from insects/rodents. The cable is typically installed in the duct 19 by pulling or blowing the cable through the installed overhead conduit 11, although the cable can be provided in the duct 19 prior to installing the overhead conduit 11.

FIG. 3 illustrates the overhead conduit 11 in use. The overhead conduit 11 is attached to poles 21 or a ceiling fixture 23, e.g., under an eve 27 or tunnel ceiling, by clamps 25. The clamps 25 engage the messenger wire 13 by friction. The messenger wire 13 is strong enough to support the overall weight of the overhead conduit 11. The web 17 is strong enough to support the weight of the duct 19 and any enclosed cables and to keep the duct 19 attached to the messenger wire 13.

In practice, overhead conduit 11 is delivered on site on a spool of limited length, e.g., 500 feet. Often, the spool length of the overhead conduit 11 is insufficient to run from a starting point A to a finish point B, e.g., between structures 29 and 31 in FIG. 3. Hence, a first section 11A of the overhead conduit 11 is connected to a second section 11B of overhead conduit 11.

FIG. 4 is a cross sectional view illustrating a manner of connection, known in the prior art, between the first section 11A of the overhead conduit 11 and the second section 11B of overhead conduit 11. The first and second webs 17A and 17B are cut and pulled away from the first and second ducts 19A and 19B for a few inches at the ends. About an inch of the first and second coatings 15A and 15B and first and second webs 17A and 17B are removed from the ends of the first and second messenger wires 13A and 13B. A clamp 33 rigidly connects the first messenger wire 13A to the second messenger wire 13B. The clamp 33 may include screws/bolts 35 or other forms of fasteners, e.g., a crimp. It is also possible to leave the first and second coatings 15A and 15B on the first and second messenger wires 13A and 13B and to have the clamp 33 frictional engage the first and second messenger wires 13A and 13B through the first and second coatings 15A and 15B.

Ends of the first and second ducts 19A and 19B are coupled together using a coupling 37. The end of the first duct 19A has glue applied to it and is then slid into a first side 37A of the coupling 37. Likewise, the end of the second duct 19B has glue applied to it and is then slid into a second side 37B of the coupling 37. Alternatively, the ends of the first and second ducts 19A and 19B may be coupled using a mechanical compression coupler or screw-on type of coupler, as known in the existing arts.

Additional prior art can be found in the following references U.S. Pat. Nos. 3,464,660; 3,483,313; 4,856,867; 5,678,609; 5,743,300; 6,283,158; 6,546,175; 6,691,742; 6,886,601; and US Published Application 2005/0224124, each of which is herein incorporated by reference.

SUMMARY OF THE INVENTION

Although the overhead conduit 11 of the prior art performs its intended purpose and has been employed for several decades now, the Applicant has appreciated some drawbacks.

One issue with prior art overhead conduits 11 is that coupling the first section 11A of the overhead conduit 11 to the second section 11B of overhead conduit 11 is time consuming, somewhat difficult and sometimes leads to water leakage at the coupling 37. FIGS. 5 and 6 depict two potential issues that can arise when pulling and/or cutting the web 17 away from the duct 19.

In FIG. 5, divots 39 are formed in the outer surface of the duct 19 and excess polymer masses 41 adhere to the edge of the web 17 during the pulling/cutting process to separate the web 17 from the duct 19. The divots 39 can create a passageway for water to infiltrate into the coupling 37. Water infiltration can damage the cabling within the duct 19 by corrosion, and also by applied pressure if the water freezes. Also, water can change the performance characteristic of the cabling, degrading signal transmission performance. Also, water adds weight to the overhead conduit 11, which can lead to clamps 25 or poles 21 or ceiling fixtures 23 failing and/or the webs 17 tearing, and the collapse of the overhead conduit 11 to the ground.

In FIG. 6, divots 39 are formed in the edge of the web 17 and excess polymer masses 41 are left on the outer surface of the duct 19 during the pulling/cutting process to separate the web 17 from the duct 19. The excess polymer masses 41 can prevent the end of the duct 19 from fully seating into the coupling 37. Alternatively, the excess polymer masses 41, if forced into the coupling 37, can act as a standoff creating gaps to both sides of the excess polymer masses 41. Under either circumstance, the connection between the end of the duct 19 and the coupling 37 can be compromised and the potential for water leakage into the coupling 37 and duct 19 is increased.

With the design of the prior art, it is rather time consuming to take a blade tool and scrap clean the outer surface of the end of the duct 19 to ensure a proper fit into the coupling 37.

The Applicant has appreciated a need in the art for an overhead conduit with strengthen member, such as a messenger wire or cable, which is designed to be easier and less time consuming to terminate into a coupling.

The Applicant has appreciated a need in the art for an overhead conduit having a duct which can be made thinner while still exhibiting the overall strength to support cables therein and remain attached to the strengthen member.

The Applicant has appreciated a need in the art for an overhead conduit, which exhibits material and fabrication costs savings as compared to the overhead conduits 11 of the prior art.

The Applicant has appreciated a need in the art for an overhead conduit, which exhibits increased flame resistance for use in areas prone to fires, e.g., the forest fire regions of the mid-west and western US.

These and other objects are addressed by the overhead conduit of the present invention, as described herein. In one embodiment, the overhead conduit of the present invention includes a duct extending in a longitudinal direction. The duct has an outer wall. A strength member, such as a messenger wire or cable, abuts the outer wall of the duct. An extruded jacket surrounds the duct and the strength member. The extruded jacket follows the outer contours of the duct and the strength member. Optional first and second subducts or micro-ducts, smaller than the duct, may be located to the right and left of the messenger wire.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limits of the present invention, and wherein.

DETAILED DESCRIPTION OF EMBODIMENTS OF THE INVENTION

Figure 1:
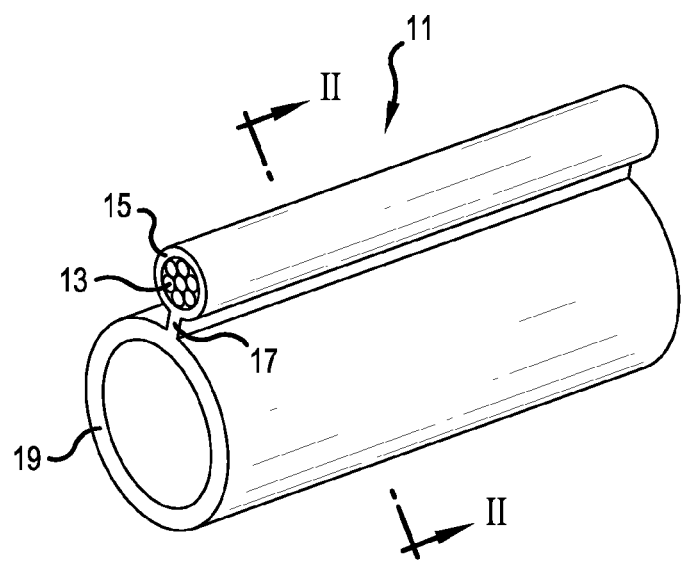
FIG. 1 is a perspective view of an overhead conduit, in accordance with the prior art.
Figure 2:
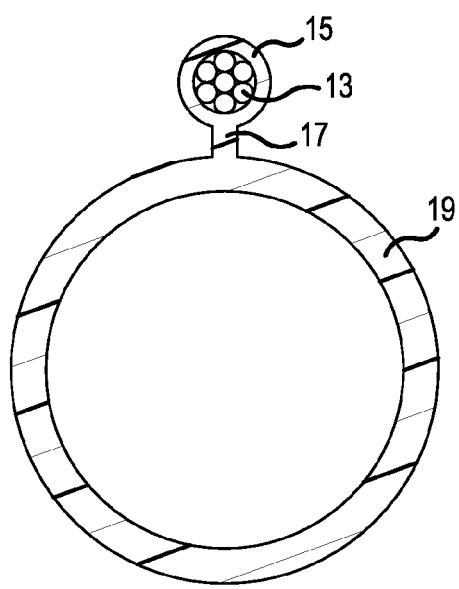
FIG. 2 is a cross sectional view taken along line II-II in FIG. 1.

The present invention now is described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

Like numbers refer to like elements throughout. In the figures, the thickness of certain lines, layers, components, elements or features may be exaggerated for clarity. Broken lines illustrate optional features or operations unless specified otherwise.

The terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity.

As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. As used herein, phrases such as "between X and Y" and "between about X and Y" should be interpreted to include X and Y. As used herein, phrases such as "between about X and Y" mean "between about X and about Y." As used herein, phrases such as "from about X to Y" mean "from about X to about Y."

It will be understood that when an element is referred to as being "on", "attached" to, "connected" to, "coupled" with, "contacting", etc., another element, it can be directly on, attached to, connected to, coupled with or contacting the other element or intervening elements may also be present. In contrast, when an element is referred to as being, for example, "directly on", "directly attached" to, "directly connected" to, "directly coupled" with or "directly contacting" another element, there are no intervening elements present. It will also be appreciated by those of skill in the art that references to a structure or feature that is disposed "adjacent" another feature may have portions that overlap or underlie the adjacent feature.

Spatially relative terms, such as "under", "below", "lower", "over", "upper", "lateral", "left", "right" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is inverted, elements described as "under" or "beneath" other elements or features would then be oriented "over" the other elements or features. The device may be otherwise oriented (rotated 90 degrees or at other orientations) and the descriptors of relative spatial relationships used herein interpreted accordingly.

Figure 7:
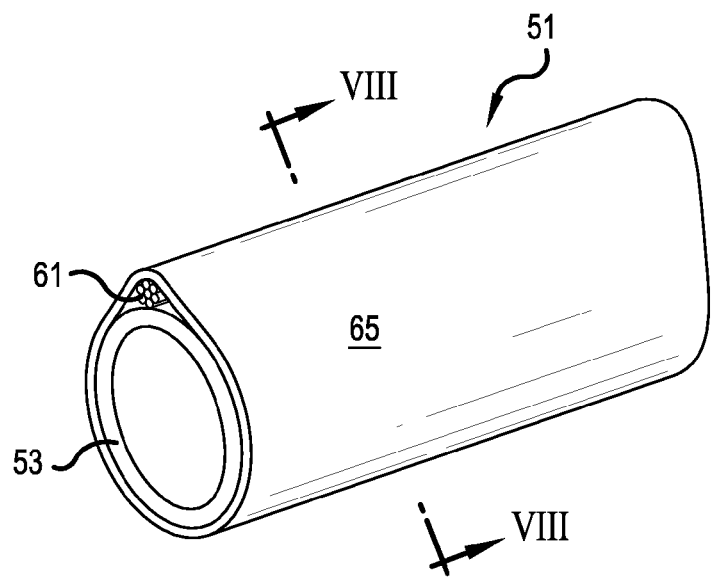
FIG. 7 is a perspective view of an overhead conduit, in accordance with the present invention.
Figure 8:
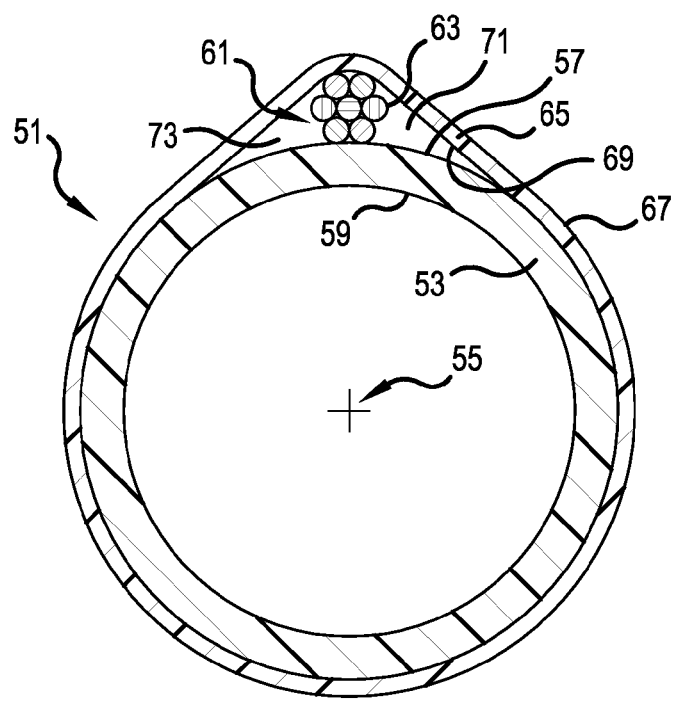
FIG. 8 is a cross sectional view taken along line VIII-VIII in FIG. 7.

FIG. 7 is a perspective view of an overhead conduit 51, in accordance with the present invention. FIG. 8 is a cross sectional view taken along line VIII-VIII in FIG. 7.

The overhead conduit 51 includes a duct 53 extending in a longitudinal direction 55 (taken as into and out of the page in FIG. 8, along the central axis of the duct 53). The duct 53 has an outer wall 57 and an inner wall 59.

A strength member 61 extends in the longitudinal direction 55. The strength member 61 has an outer surface 63. A portion of the outer surface 63 of the strength member 61 abuts the outer wall 57 of the duct 53.

An extruded jacket 65 surrounds the duct 53 and the strength member 61. The extruded jacket 65 has an outside surface 67 and an inside surface 69. A portion of the inside surface 69 of the extruded jacket 65 abuts the outer wall 57 of the duct 53. Also, a portion of the inside surface 69 of the extruded jacket 65 abuts the outer surface 63 of the strength member 61.

As shown in FIG. 8, first and second air pockets 71 and 73 are formed to the sides of the abutment between the strength member 61 and the duct 53. The first and second air pockets 71 and 73 are defined by the inside surface 69 of the extruded jacket 65, the outer wall 57 of the duct 53 and the outer surface 63 of the strength member 61.

In one embodiment, the duct 53 is formed of high density polyethylene (HDPE), and the extruded jacket 65 is formed of medium density polyethylene (MDPE) or low density polyethylene (LDPE) or linear low density polyethylene (LLDPE). Other materials may be used to form the duct 53 and extruded jacket 65, such as different polymers.

In one embodiment, the strength member 61 is a messenger wire or cable formed of metal strands, so that the portions of the outer surface 63 of the strength member 61 abutting the outer wall 57 of the duct 53 and abutting the inside surface 69 of the extruded jacket 65 are formed by the metal strands. Other materials may be used to form the strength member 61 such as a reinforced polymer rod instead of a stranded metal wire.

As best seen in FIG. 8, the extruded jacket 65 tightly surrounds the duct 53 and the strength member 61. The extruded jacket 65 follows the outer contours, e.g., the outer wall 57, of the duct 53 in the areas of abutment between the extruded jacket 65 and the duct 53. Further, the extruded jacket 65 follows the outer contours, e.g., the outer surface 63, of the strength member 61 in the areas of abutment between the extruded jacket 65 and the strength member 61.

In one embodiment, the extruded jacket 65 is formed of a fire retardant polymer, such as polyvinylidene fluoride (PVDF). The fire retardant polymer will assist the overhead conduit 51 in resisting damage if employed in a fire-prone area, such as in forested areas of the mid-west and western sections of the US.

Figure 9:
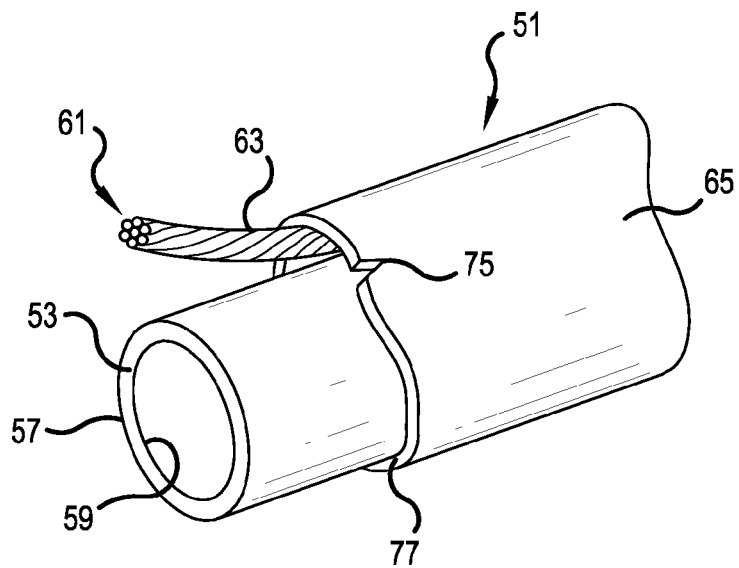
FIG. 9 is a perspective view of the overhead conduit of FIG. 7 with a portion of an outer jacket removed.

FIG. 9 is a perspective view of the overhead conduit 51 with a portion of the outer jacket 65 removed. To remove the outer jacket 65, a technician can use a utility knife to cut through the extruded jacket 65 into the area of the first air pocket 71, e.g., along a line ending at a small incision 75 in FIG. 9. A knife or scissors can be used to cut off an end portion of the extruded jacket 65, e.g., along edge 77 in FIG. 9, to expose an end of the duct 53 and the strength member 61.

Figure 5:
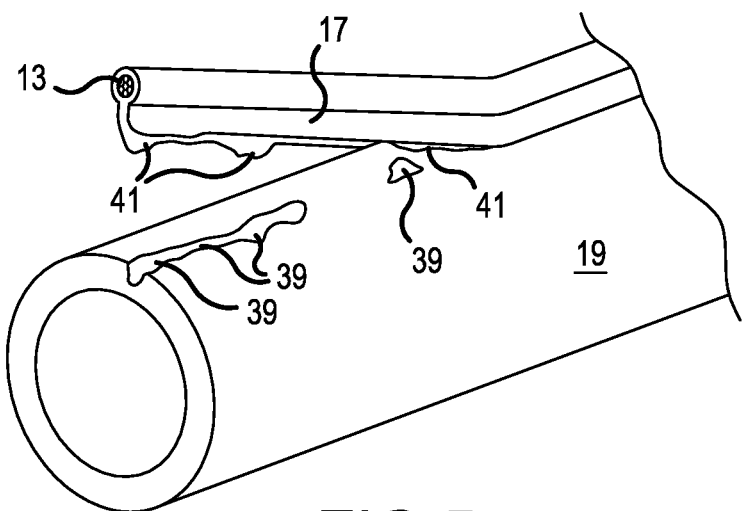
FIG. 5 is a perspective view of an end of an overhead conduit illustrating a first potential drawback of the prior art during the coupling process.
Figure 6:
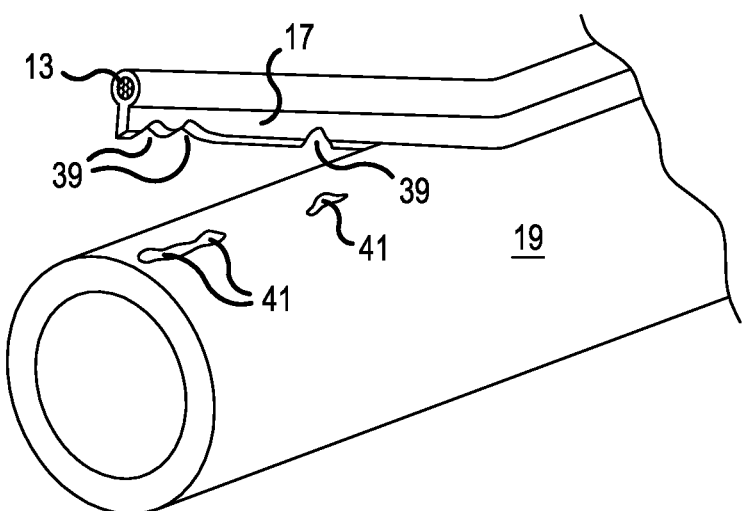
FIG. 6 is a perspective view of an end of an overhead conduit illustrating a second potential drawback of the prior art during the coupling process.

It will be appreciated that the extruded jacket 65 does not adhere to the duct 53 or the strength member 61, as typically occurs with the prior art depicted in FIGS. 5 and 6. This is due, at least in part, to a manufacturing process for the overhead conduit 51.

In a method of forming the overhead conduit 51, a polymer duct 53 is fed into an extrusion machine. The strength member 61 is also fed into the extrusion machine. The strength member 61 is abutted against the outer wall 57 of the duct 53. Finally, the jacket 65 is extruded over the duct 53 and the strength member 61. The extruded jacket 65 may optionally be draw inwards to dip slightly into the first and second air pockets 71 and 73 by applying a vacuum on the crosshead during the extrusion process when applying the extruded jacket 65 onto the duct 53 and the strength member 61.

The extruded jacket 65 does not adhere to, or at least does not strongly adhere to, the outer wall 57 of the duct 53 because the extruded jacket 65 is not extruded at the same time as the duct 53 and/or because the extruded jacket 65 is formed of a different material than the duct 53. Also, when the extruded jacket 65 is extruded onto the duct 53, the combination can be submerged and permitted to pass along a cool water bath, so that the heat of the extruded jacket 65 does not have time to melt the outer wall 57 of the duct 53 and create a material adherence. Further, a coating may optionally be applied to the outer wall 57 of the duct 53 to prevent adherence between the extruded jacket 65 and the duct 53.

Figure 10:
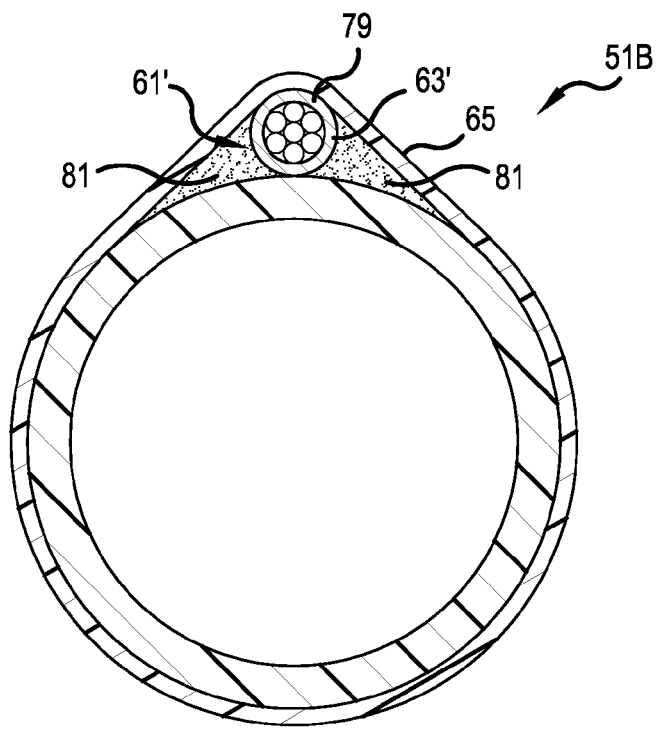
FIG. 10 is a cross sectional view similar to FIG. 8, but showing a first alternative embodiment of the overhead conduit, in accordance with the present invention.

FIG. 10 is a cross sectional view similar to FIG. 8, but showing some optional and/or alternative features of an overhead conduit 51B of the present invention. In FIG. 10, the strength member 61' is a messenger wire formed of metal strands. However, the metal strands are surrounded by a coating or sub-jacket 79. The coating or sub-jacket 79 can assist in preventing adherence between the extruded jacket 65 and the strength member 61', and may include a material unlike the material used to form the extruded jacket 65 and/or ingredients to prevent adherence such as polytetrafluoroethylene. The portions of the outer surface 63' of the strength member 61' abutting the outer wall 57 of the duct 53 and abutting the inside surface 69 of the extruded jacket 65 are formed by the coating or sub-jacket 79.

FIG. 10 also illustrates that the end portions of the first and second air pockets 71 and 73 may be filled with a gel, foam or caulk 81. The gel, foam or caulk 81 may be employed regardless of whether or not the coating or sub-jacket 79 is used on the strength member 61, 61'. The gel, foam or caulk 81 can resist the intrusion of water or moisture into the first and second air pockets 71 and 73 at a termination end of the overhead conduit 51, 51B. The first and second air pockets 71 and 73 may optionally be filled with the gel, foam or caulk 81 along the entire length of the overhead conduit 51, 51B. Alternatively, pockets of the gel, foam or caulk 81 may be formed within the first and second air pockets 71 and 73 at intervals along the entire length of the overhead conduit 51, 51B to create spaced moisture barriers.

Figure 11:
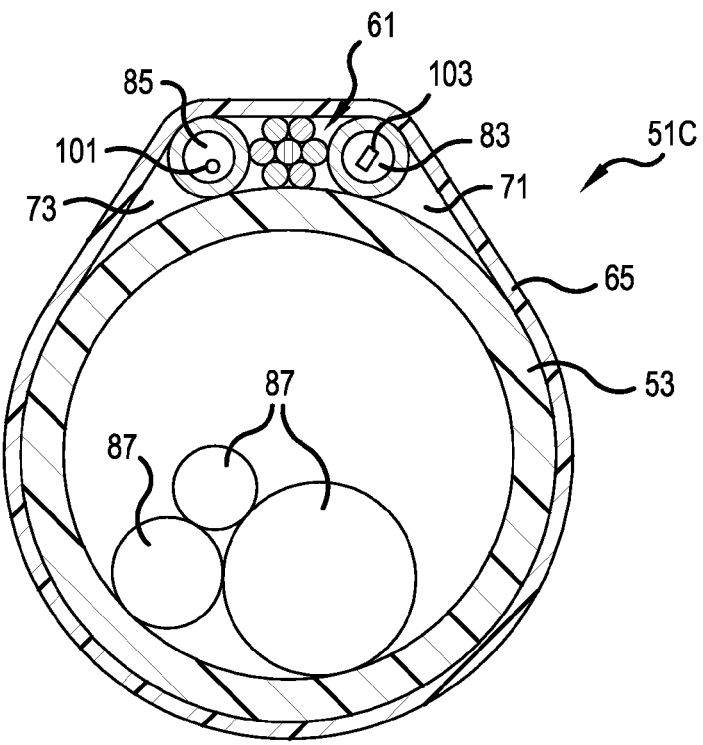
FIG. 11 is a cross sectional view similar to FIG. 8, but showing a second alternative embodiment of the overhead conduit, in accordance with the present invention.

FIG. 11 is a cross sectional view similar to FIG. 8, but showing an alternative embodiment of the overhead conduit 51C, in accordance with the present invention. In the overhead conduit 51C, the first and second air pockets 71 and 73 possess first and second sub-ducts or micro-ducts 83 and 85, respectively. A diameter of the first sub-duct or micro-duct 83 is less than half a diameter of the duct 53, such as less than 10% of the diameter of the duct 53. Likewise, a diameter of the second sub-duct or micro-duct 85 is less than half the diameter of the duct 53, such as less than 10% of the diameter of the duct 53. In the depicted embodiment, the diameter of the first sub-duct or micro-duct 83 is the same as the diameter of the second sub-duct or micro-duct 85, although this is optional.

FIG. 11 also illustrates a plurality of cables 87 within the duct 53. The cables 87 may include coaxial cables, twisted pair cables, power/control cables and/or fiber optic cables. The sub-ducts or micro-ducts 83 and 85 may be used as future pathways to hold one or more micro-fibers 101 or other types of small cables. Typically, a micro-fiber 101 is later installed by blowing the micro-fiber 101 through the sub-duct or micro-duct 83 and 85. However, it is possible to initially supply a pull-line or tape 103 in the sub-duct or micro-duct 83 and 85, so that the installation of a future microfiber 101 or different cable can be assisted by the pull-line or tape 103. Of course, one or more pull-lines or tapes 103 could be optionally installed in the duct 53, and one or more of the cables 87 may optionally be pre-installed in the duct 53 before the overhead conduit 51C is delivered to its installation site. The extruded jacket 65 tightly surrounds the duct 53, the first and second sub-ducts or micro-ducts 83 and 85, and the strength member 61. As described in conjunction with FIG. 8, the extruded jacket 65 follows the outer contours, e.g., the outer wall 57, of the duct 53 in the areas of abutment between the extruded jacket 65 and the duct 53. Further, the extruded jacket 65 follows the outer contours, e.g., the outer surface 63, of the strength member 61 in the areas of abutment between the extruded jacket 65 and the strength member 61. Further, the extruded jacket 65 follows the outer contours of the first and second sub-ducts or micro-ducts 83 and 85 in the areas of abutment between the extruded jacket 65 and the first and second sub-ducts or micro-ducts 83 and 85.

Figure 12:
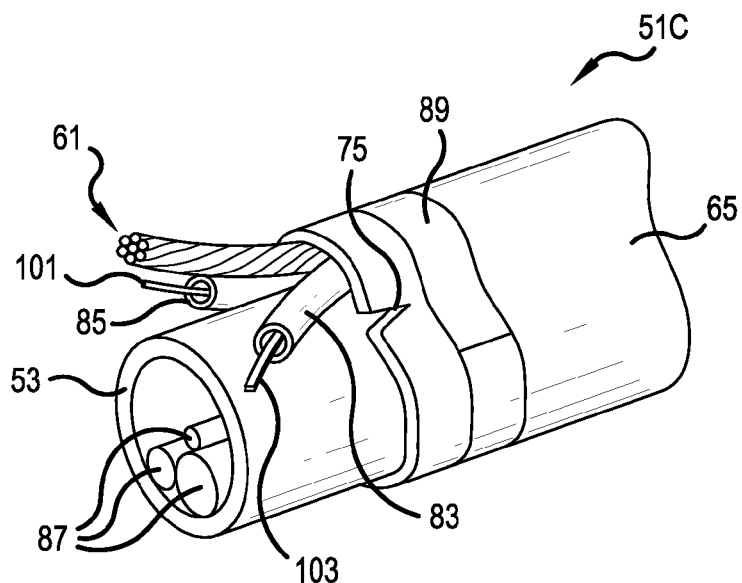
FIG. 12 is a perspective view of the overhead conduit of FIG. 11 with a portion of an outer jacket removed.

FIG. 12 is a perspective view of the overhead conduit 51C of FIG. 11 with a portion of the extruded jacket 65 removed. The extruded jacket 65 may be removed in the same manner as described in conjunction with FIG. 9. If there is a concern about the small incision 75 of FIGS. 9 and 12 continuing to tear over time along the length of the overhead conduit 51, 51B, 51C, a tape 89 may be wound a few times around the entire overhead conduit 51, 51B or 51C, or a hose clamp may be employed or other form of a lashing strap system, such as the ABstrap™ made by Allied Bolt Products, LLC.

Figure 4:
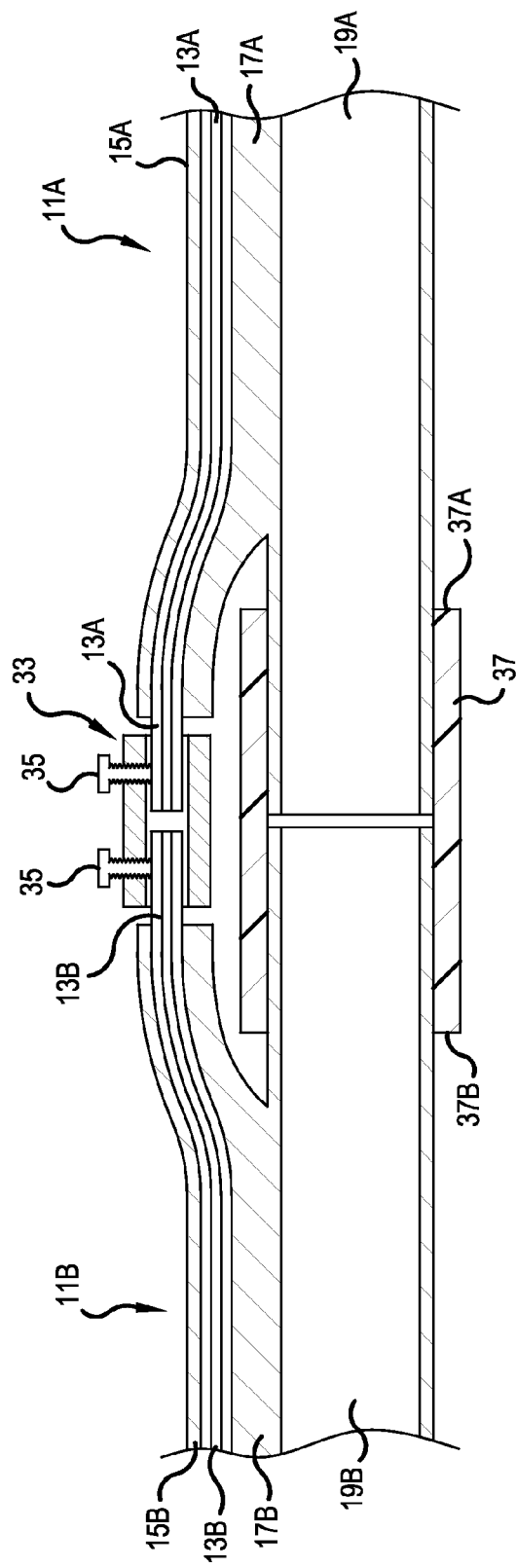
FIG. 4 is a cross sectional view of a messenger wire clamp and duct coupling in FIG. 3.

Once the end of the strength member 61 and the end of the duct 53 are exposed, the overhead conduit 51, 51B or 51C may be connected to a second section of overhead conduit using the clamp 33 and coupling 37 of the prior art, shown in FIG. 4, or by any other manner known.

Figure 3:
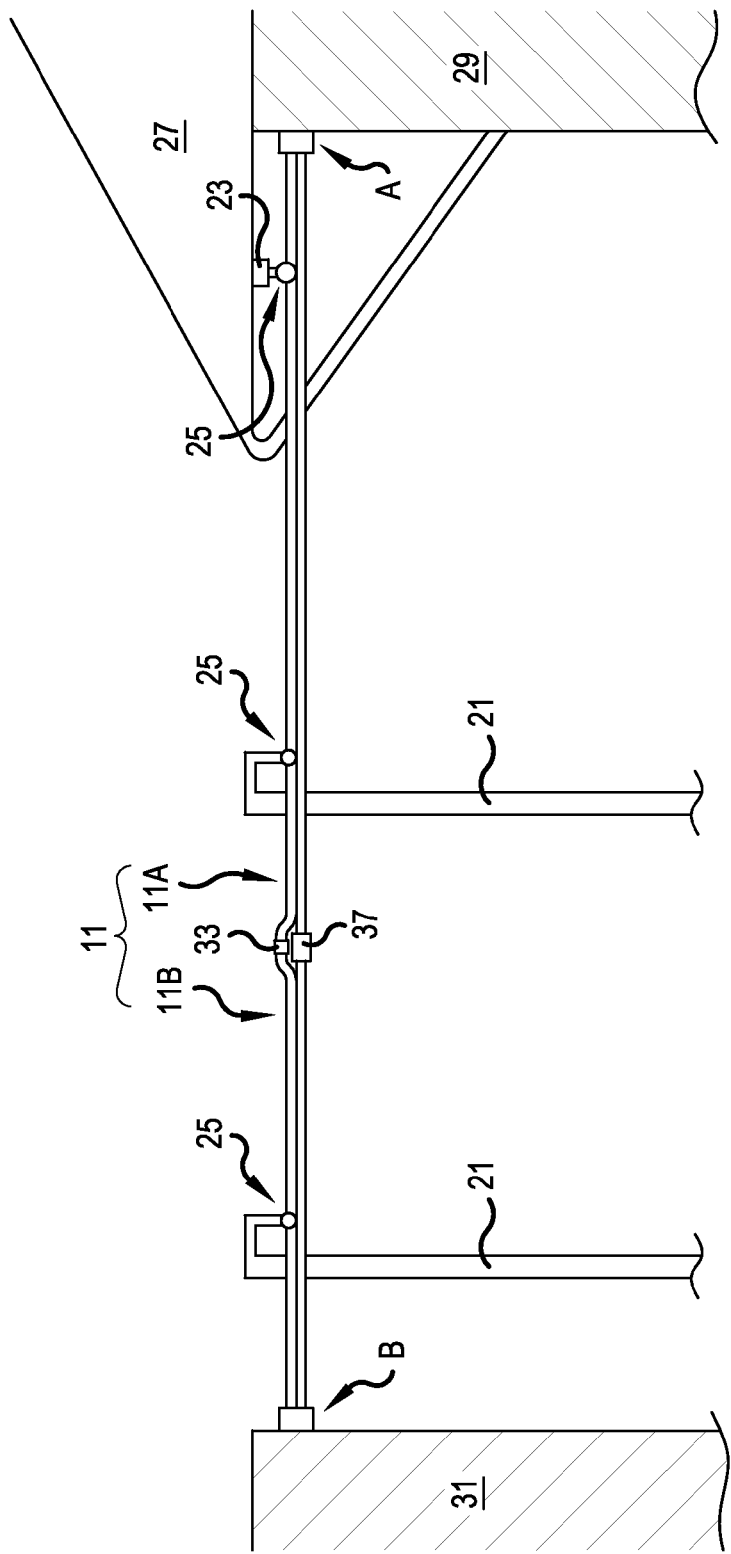
FIG. 3 is a side view of an overhead conduit system connecting point A to point B, in accordance with the prior art.
Figure 13:
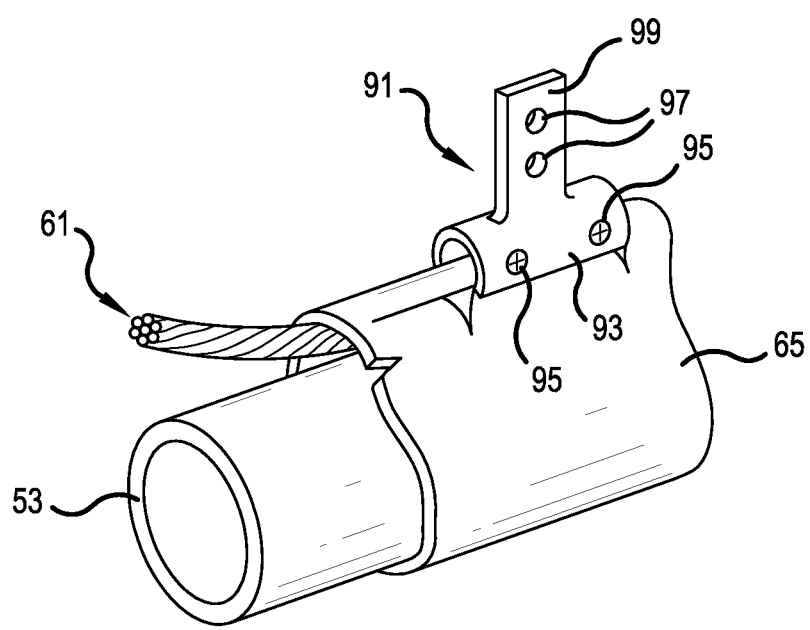
FIG. 13 is a perspective view of the overhead conduit of FIG. 9, showing a clamp installed on the messenger wire.

FIG. 13 is a perspective view of the overhead conduit 51 of FIG. 9, showing a clamp 91 installed on the strength member 61, e.g., messenger wire. The clamp 91 includes a first part 93 which includes fasteners 95, e.g., screws or bolts, to close the clamp onto the strength member 61 and frictionally retain the strength member 61, optionally tearing through the extruded jacket 65. A second part, or support 99 has a first end attached to the first part 93 and a second end for anchoring to a fixture, e.g., pole 21 or ceiling fixture 23 as depicted in FIG. 3. The anchoring may be accomplished by passing one or more fasteners through one or more holes 97 in the support 99. Although FIG. 13 shows two fasteners 95 attaching the first part 93 to the strength member 61, the first part 93 may include more fasteners 95, such as three fasteners 95 similar to the three bolt clamps produced by Allied Bolt Products, LLC.

As for the dimensions of the component parts of the present invention, the extruded jacket 65 preferably has a thickness of less than 500 mils and the duct 53 preferably has an inner diameter of less than 7 inches. For example, the duct 53 may have an inner diameter, measured at the inner wall 59 of the duct 53, which is less than 2 inches, and the extruded jacket may have a generally uniform thickness set at a value of about 30 to about 150 mils.

In one particular embodiment, the strength member 61 is a messenger wire formed of metal strands and has a diameter of between about 0.25 inches to about 0.5 inches, the duct 53 has an inner diameter measured at the inner wall 59 of the duct 53 which is between about 1 inch to about 1.75 inches, and the extruded jacket 65 has a uniform thickness of about 30 mils to about 75 mils. Of course, the dimensions may be varied to accommodate the end use of the overhead conduit. Although in a preferred embodiment, the extruded jacket 65 is not made so thick as to retain sufficient heat during the manufacturing process as to partially melt the outer wall 57 of the duct 53.

The inventor determined that heat retained in the extruded jacket 65 can cause the outer wall 57 of the duct 53 to partially melt and lead to an adhesion between the extruded jacket 65 and the outer wall 57 of the duct 53. Once the extruded jacket 65 is reduced in thickness, the extruded jacket 65 no longer retains sufficient heat to partially melt the outer wall 57 of the duct 53. Also, it was discovered that moving a cooling water bath very close to the jacket extrusion point further assists in preventing adhesion between the extruded jacket 65 and duct 53. The cooling water bath quickly cooled the extruded jacket 65 before it could transfer sufficient heat to the duct 53 to cause the outer wall 57 to start to melt. In a preferred embodiment, the water bath was moved from about two feet away to less than about one foot away from the extrusion point of the extruded jacket 65.

Although the above description has focused on embodiments of the invention having a main duct 53 and potentially two sub-ducts or micro-ducts 83 and 85, it would be possible to have more than one main duct 53 and fewer or more sub-ducts or micro-ducts 83 and 85. For example, the overhead conduit of the present invention could include three main ducts and three sub-ducts or micro-ducts suspended below a strength member 61 within a single extruded jacket 65.

The overhead conduit of the present invention allows for easy and improved messenger wire access when applying clamps 91 and for easy messenger wire 61/duct 53 separation at terminations and couplings, as shown in FIG. 4. The present invention also allows for various types of materials to be used for the extruded jacket 65 to address an array of specified applications. For example, stronger extruded jacket materials may be employed for overhead conduits in areas prone to vibration (earthquakes) and high winds (hurricanes), and fire resistant materials may be employed in areas prone to wildfires. The interior ducts and sub-ducts may be fabricated from a non-specialized, and less expensive, material in each instance, since the interior ducts are not exposed to the environment and do not play a role in the strength of the overhead conduit to resist environmental elements. In the designs of the prior art, the duct was integrally formed of the same material exposed to the environment. Also, the internal duct may be made thinner, e.g., cheaper, since the extruded jacket acts as a secondary wall to strengthen the overall, overhead conduit.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

I claim:

1. An overhead conduit comprising:
a duct extending in a longitudinal direction, said duct having a cylindrical outer wall and an inner wall;
a strength member extending in the longitudinal direction as a separate element from said duct, said strength member having an outer surface, wherein a portion of said outer surface of said strength member directly abuts said outer wall of said duct; and
an extruded jacket surrounding said duct and said strength member, said extruded jacket having an outside surface and an inside surface, wherein a portion of said inside surface of said extruded jacket abuts said outer wall of said duct and a portion of said inside surface of said extruded jacket abuts said outer surface of said strength member.

2. The overhead conduit of claim 1, wherein first and second pockets are formed to the sides of the abutment between said strength member and said duct, said first and second pockets being defined by said inside surface of said extruded jacket, said outer wall of said duct and said outer surface of said strength member.

3. The overhead conduit of claim 2, wherein at least portions of said first and second pockets are filled with a gel, foam or caulk.

4. The overhead conduit of claim 2, wherein said first and second pockets possess first and second sub-ducts, respectively, wherein a diameter of said first sub-duct is less than half a diameter of said duct, and wherein a diameter of said second sub-duct is less than half the diameter of said duct.

5. The overhead conduit of claim 1, further comprising:
a clamp engaging onto said strength member; and
a support having a first end attached to said clamp and a second end for anchoring to a fixture.

6. The overhead conduit of claim 1, wherein said extruded jacket is formed of a fire retardant polymer.

7. The overhead conduit of claim 6, wherein said fire retardant polymer includes polyvinylidene fluoride (PVDF).

8. The overhead conduit of claim 1, wherein said strength member is a messenger wire formed of metal strands, and wherein said portions of said outer surface of said strength member abutting said outer wall of said duct and abutting said inside surface of said extruded jacket are formed by said metal strands.

9. The overhead conduit of claim 1, wherein said strength member is a messenger wire formed of metal strands surrounded by a coating or sub-jacket, and wherein said portions of said outer surface of said strength member abutting said outer wall of said duct and abutting said inside surface of said extruded jacket are formed by said coating or sub-jacket.

10. The overhead conduit of claim 1, wherein said extruded jacket has a thickness of less than 500 mils.

11. The overhead conduit of claim 1, wherein said duct has an inner diameter, measured at said inner wall of said duct, which is less than 2 inches, and wherein said extruded jacket has a generally uniform thickness set at a value of about 30 to about 150 mils.

12. The overhead conduit of claim 11, wherein said duct has an inner diameter measured at said inner wall of said duct which is between about 1 inch to about 1.75 inches, and wherein said extruded jacket has a thickness of about 30 mils to about 75 mils, and wherein said strength member is a messenger wire formed of metal strands and has a diameter of between about 0.25 inches to about 0.5 inches.

13. The overhead conduit of claim 1, wherein said duct is formed of high density polyethylene (HDPE), and wherein said extruded jacket is formed of medium density polyethylene (MDPE) or low density polyethylene (LDPE) or linear low density polyethylene (LLDPE).

14. The overhead conduit of claim 1, wherein said extruded jacket tightly surrounds said duct and said strength member, wherein said extruded jacket follows the outer contours of said duct in the areas of abutment between said extruded jacket and said duct, and wherein said extruded jacket follows the outer contours of said strength member in the areas of abutment between said extruded jacket and said strength member.

15. The overhead conduit of claim 1, wherein said extruded jacket entirely covers said duct and said strength member and has a generally uniform thickness along the longitudinal direction of said overhead conduit.

16. The overhead conduit of claim 1, wherein said inner wall of said duct is a continuous cylindrical wall with a diameter.

17. An overhead conduit consisting essentially of:
a duct extending in a longitudinal direction, said duct having a cylindrical outer wall and an inner wall;
a strength member extending in the longitudinal direction as a separate element from said duct, said strength member having an outer surface, wherein a portion of said outer surface of said strength member directly abuts said outer wall of said duct; and
an extruded jacket surrounding said duct and said strength member, said extruded jacket having an outside surface and an inside surface, wherein a portion of said inside surface of said extruded jacket abuts said outer wall of said duct and a portion of said inside surface of said extruded jacket abuts said outer surface of said strength member.

18. The overhead conduit of claim 17, wherein the strength member is a messenger wire formed of metal strands, wherein said duct is formed of high density polyethylene (HDPE), and wherein said extruded jacket is formed of medium density polyethylene (MDPE) or low density polyethylene (LDPE) or linear low density polyethylene (LLDPE).

19. The overhead conduit of claim 17, wherein said strength member is a messenger wire formed of metal strands, and wherein said portions of said outer surface of said strength member abutting said outer wall of said duct and abutting said inside surface of said extruded jacket are formed by said metal strands.

20. The overhead conduit of claim 17, wherein said strength member is a messenger wire formed of metal strands surrounded by a coating or sub-jacket, and wherein said portions of said outer surface of said strength member abutting said outer wall of said duct and abutting said inside surface of said extruded jacket are formed by said coating or sub-jacket.

* * * * *